(12) United States Patent
Hietala et al.

(10) Patent No.: US 7,359,453 B1
(45) Date of Patent: Apr. 15, 2008

(54) SYSTEM AND METHOD FOR TRANSITIONING BETWEEN MODULATION FORMATS IN ADJACENT BURSTS TRIGGERING ON RAMPS

(75) Inventors: Alexander Wayne Hietala, Phoenix, AZ (US); Christopher Truong Ngo, Chandler, AZ (US)

(73) Assignee: RF Micro Devices, Inc., Greensboro, NC (US)

( * ) Notice: Subject to any disclaimer, the term of this patent is extended or adjusted under 35 U.S.C. 154(b) by 618 days.

(21) Appl. No.: 10/985,209

(22) Filed: Nov. 10, 2004

Related U.S. Application Data

(60) Provisional application No. 60/606,995, filed on Sep. 3, 2004.

(51) Int. Cl.
*H04K 1/02* (2006.01)
(52) U.S. Cl. .................. 375/296; 375/295; 375/297
(58) Field of Classification Search ............ 375/295, 375/316, 296, 297
See application file for complete search history.

(56) References Cited

U.S. PATENT DOCUMENTS

| | | | |
|---|---|---|---|
| 6,185,259 B1 * | 2/2001 | Dent | 375/261 |
| 6,563,884 B1 * | 5/2003 | Nikula | 375/295 |
| 6,597,743 B1 * | 7/2003 | Khayrallah et al. | 375/265 |
| 6,693,488 B1 * | 2/2004 | van Rhijn | 330/129 |
| 2002/0106032 A1 * | 8/2002 | Navarro et al. | 375/259 |
| 2004/0198270 A1 * | 10/2004 | Rozenblit et al. | 455/126 |
| 2004/0208157 A1 * | 10/2004 | Sander et al. | 370/345 |

* cited by examiner

*Primary Examiner*—Chieh M. Fan
*Assistant Examiner*—Jason M. Perilla
(74) *Attorney, Agent, or Firm*—Winthrow & Terranova, PLLC

(57) ABSTRACT

A modulation system and method are provided for transitioning between modulation formats in adjacent transmit bursts. The modulation system includes a data interface, first modulation circuitry operating according to a first modulation format, and second modulation circuitry operating according to a second modulation format. During a transition, a timing signal triggers ramp-down of an output power of a power amplifier amplifying modulated data for the first transmit burst. Upon receiving the timing signal, the data interface proceeds to provide a current symbol of data for the first transmit burst. Upon completion of the current symbol, the data interface delays data for a second transmit burst by a variable delay time prior to providing the data for the second transmit burst to the second modulation circuitry, and the second modulation circuitry is reset. Accordingly, a glitch caused by resetting the second modulation circuitry occurs before ramp-up for the second transmit burst.

16 Claims, 10 Drawing Sheets

SYSTEM AND METHOD FOR TRANSITIONING BETWEEN MODULATION FORMATS IN ADJACENT BURSTS TRIGGERING ON RAMPS

CROSS-REFERENCE TO RELATED APPLICATIONS

This U.S. patent application claims the benefit of provisional patent application Ser. No. 60/606,995, filed Sep. 3, 2004, the disclosure of which is hereby incorporated by reference in its entirety.

This U.S. patent application is related to concurrently filed U.S. patent application Ser. No. 10/985,207, SYSTEM AND METHOD FOR TRANSITIONING BETWEEN MODULATION FORMATS IN ADJACENT BURSTS TRIGGERING ON DATA FLOW by Hietala et al., which is incorporated herein by reference in its entirety.

FIELD OF THE INVENTION

The present invention relates to a method for transitioning between modulation formats in adjacent bursts in a multi-timeslot per frame transmission system.

BACKGROUND OF THE INVENTION

Transmission bursts in the Global System for Mobile Communications (GSM) were originally a single timeslot of Gaussian Minimum Shift Keying (GMSK) modulated data. As the need for higher data rates intensified, GSM was first modified to allow multiple timeslots per transmit frame, which is known as General Packet Radio Service (GPRS). To further increase the data rate, a second modulation scheme was added to GSM. The added modulation scheme is 8-level Phase Shift Keying (8PSK), and the resultant system is referred to as Enhanced General Packet Radio Service (EGPRS). A complication arises because adjacent timeslots within a transmit frame may contain GSMK and 8PSK modulated data and the European Telecommunications Standards Institute (ETSI) standards allow only 37 quarter symbol times (qst), which is approximately 30.5 microseconds, between adjacent timeslots.

Thus, there remains a need for a system and method of transitioning between modulation formats in adjacent timeslots of a transmit frame.

SUMMARY OF THE INVENTION

The present invention provides a system and method for transitioning between modulation formats in adjacent transmit bursts. In general, the system includes a modulation system having a data interface, first modulation circuitry operating according to a first modulation format, and second modulation circuitry operating according to a second modulation format. During a transition between a first transmit burst in the first modulation format and a second transmit burst in the second modulation format, a timing control signal triggers ramp-down of an output power of a power amplifier amplifying modulated data for the first transmit burst. Upon receiving the timing control signal triggering ramp-down, the data interface proceeds to provide a current symbol of data for the first transmit burst. Upon completion of the current symbol, the data interface delays data for a second transmit burst by a variable modulator delay time prior to providing the data for the second transmit burst to the second modulation circuitry, and the second modulation circuitry is reset. A glitch caused by resetting the second modulation circuitry occurs at a time equal to the latency of the second modulation circuitry after resetting the second modulation circuitry. The variable modulator delay time is selected such that the time at which the glitch occurs is before ramp-up of the output power of the power amplifier for the second transmit burst.

In one embodiment, either the first or second modulation circuitry includes delay circuitry such that a latency of the first modulation circuitry is equal to the latency of the second modulation circuitry.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

While the present invention is particularly well-suited for use in a mobile terminal, and particularly a mobile terminal that operates according to either a General Packet Radio Service (GPRS) scheme or an Enhanced General Packet Radio Service (EGPRS) scheme, it should be appreciated that the present invention may be used in other transmitters, either wireless or wirebased, wherein it is needed or desired to transition between modulation formats in adjacent timeslots or transmit bursts.

Figure 1:
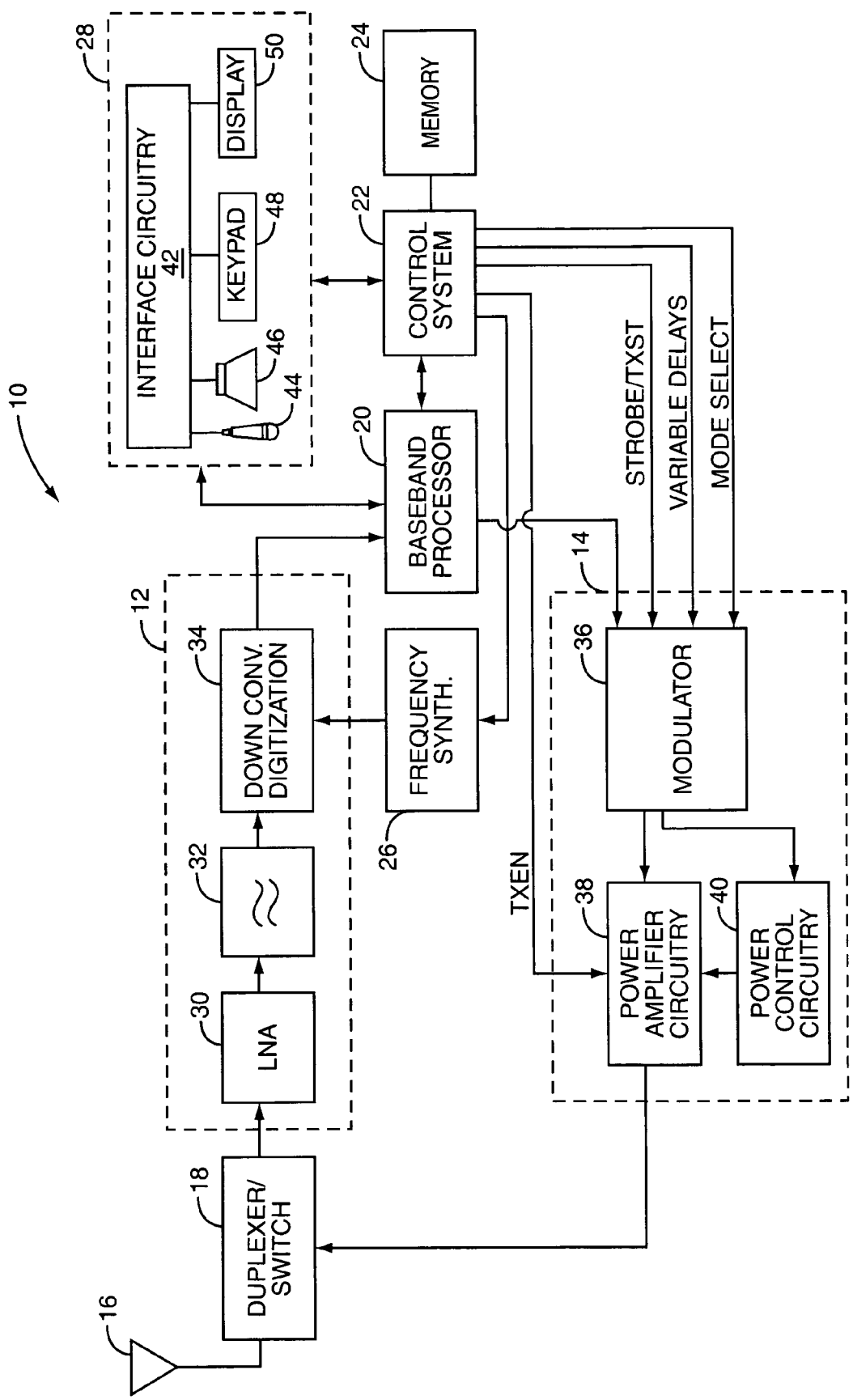
FIG. 1 illustrates an exemplary mobile terminal enabled to transition between modulation formats in adjacent transmit bursts according to one embodiment of the present invention.

The present invention is preferably incorporated in a mobile terminal 10, such as a mobile telephone, personal digital assistant, or the like. The basic architecture of a mobile terminal 10 is represented in FIG. 1, and may include a receiver front end 12, a radio frequency transmitter section 14, an antenna 16, a duplexer or switch 18, a baseband processor 20, a control system 22, memory 24, a frequency synthesizer 26, and an interface 28. The receiver front end 12 receives information bearing radio frequency signals from one or more remote transmitters provided by a base station (not shown). A low noise amplifier 30 amplifies the signal. A filter circuit 32 minimizes broadband interference in the received signal, while a downconverter 34 downconverts the filtered, received signal to an intermediate or baseband frequency signal, which is then digitized into one or more digital streams. The receiver front end 12 typically uses one or more mixing frequencies generated by the frequency synthesizer 26.

The baseband processor 20 processes the digitized, received signal to extract the information or data bits conveyed in the received signal. This processing typically comprises demodulation, decoding, and error correction operations. As such, the baseband processor 20 is generally implemented in one or more digital signal processors (DSPs).

On the transmit side, the baseband processor 20 receives digitized data from the control system 22, which it encodes for transmission. The control system 22 may run software stored in the memory 24. Alternatively, the operation of the control system 22 may be a function of sequential logic structures as is well understood. After encoding the data from the control system 22, the baseband processor 20 outputs the encoded data to the radio frequency transmitter section 14. A modulator 36 receives the data from the baseband processor 20 and operates according to one of two modulation schemes to provide a modulated signal to the power amplifier circuitry 38. The modulation scheme of the modulator 36 is controlled by a mode select signal (MODE SELECT) from the control system 22. In one embodiment, the modulator 36 operates according to either an 8-level Phase Shift Keying (8PSK) modulation scheme, which is a modulation scheme containing both amplitude and phase components, or a Gaussian Minimum Shift Keying (GMSK) modulation scheme, which is a constant amplitude modulation scheme. When in 8PSK mode, the modulator 36 provides a phase component ($\phi$) at a desired transmit frequency to the power amplifier circuitry 38 and an amplitude component (r) to the power control circuitry 40. The power control circuitry 40 controls an output power of the power amplifier circuitry 38 based on the amplitude component (r) or optionally a combination of a ramping signal and the amplitude component (r), thereby providing amplitude modulation of the phase component ($\phi$). When in GMSK mode, the modulator provides a phase modulated signal to the power amplifier circuitry 38 and the ramping signal to the power control circuitry 40, where the power control circuitry 40 controls the output power of the power amplifier circuitry 38 based on the ramping signal.

According to the present invention, the modulator 36 is enabled to transition between the two modulation modes using one or more variable delays (VARIABLE DELAYS) and a strobe signal (STROBE), which is a pulse signal. Optionally, the strobe signal (STROBE) may be replaced by a transmit start signal (TXST), which is a level control signal. The strobe signal (STROBE) and the transmit start signal (TXST) are generally referred to herein as a timing control signal. As discussed below in detail, the variable delays (VARIABLE DELAYS) are selected such that glitches caused by switching between modes occur during a period of time between transmit bursts when the output power of the power amplifier circuitry 38 is at or near a minimum output power. As a result, the glitches caused by switching modulation modes are not seen in the output spectrum of the power amplifier circuitry 38.

The power amplifier circuitry 38 amplifies the modulated signal from the modulator 36 to a level appropriate for transmission from the antenna 16. A gain of the power amplifier circuitry 38 is controlled by the power control circuitry 40. In essence, the power control circuitry 40 operates to control a supply voltage provided to the power amplifier circuitry 38 based on the amplitude component (r) or, optionally, a combination of the amplitude component (r) and the ramping signal from the modulator 36 when in the 8PSK mode and based on the ramping signal when in GMSK mode.

A user may interact with the mobile terminal 10 via the interface 28, which may include interface circuitry 42 associated with a microphone 44, a speaker 46, a keypad 48, and a display 50. The interface circuitry 42 typically includes analog-to-digital converters, digital-to-analog converters, amplifiers, and the like. Additionally, it may include a voice encoder/decoder, in which case it may communicate directly with the baseband processor 20.

The microphone 44 will typically convert audio input, such as the user's voice, into an electrical signal, which is then digitized and passed directly or indirectly to the baseband processor 20. Audio information encoded in the received signal is recovered by the baseband processor 20, and converted into an analog signal suitable for driving speaker 46 by the interface circuitry 42. The keypad 48 and display 50 enable the user to interact with the mobile terminal 10, input numbers to be dialed and address book information, or the like, as well as monitor call progress information.

While the present invention is well-suited for incorporation into a mobile terminal, such as the mobile terminal 10 just described, it should be noted that the present invention is well-suited for use in any wireless transmitter such as, but not limited to, a transmitter including the transmitter section 14, a wireless transmitter associated with a wireless LAN, and the like. As such, the present invention is not limited to a particular apparatus.

Figure 2:
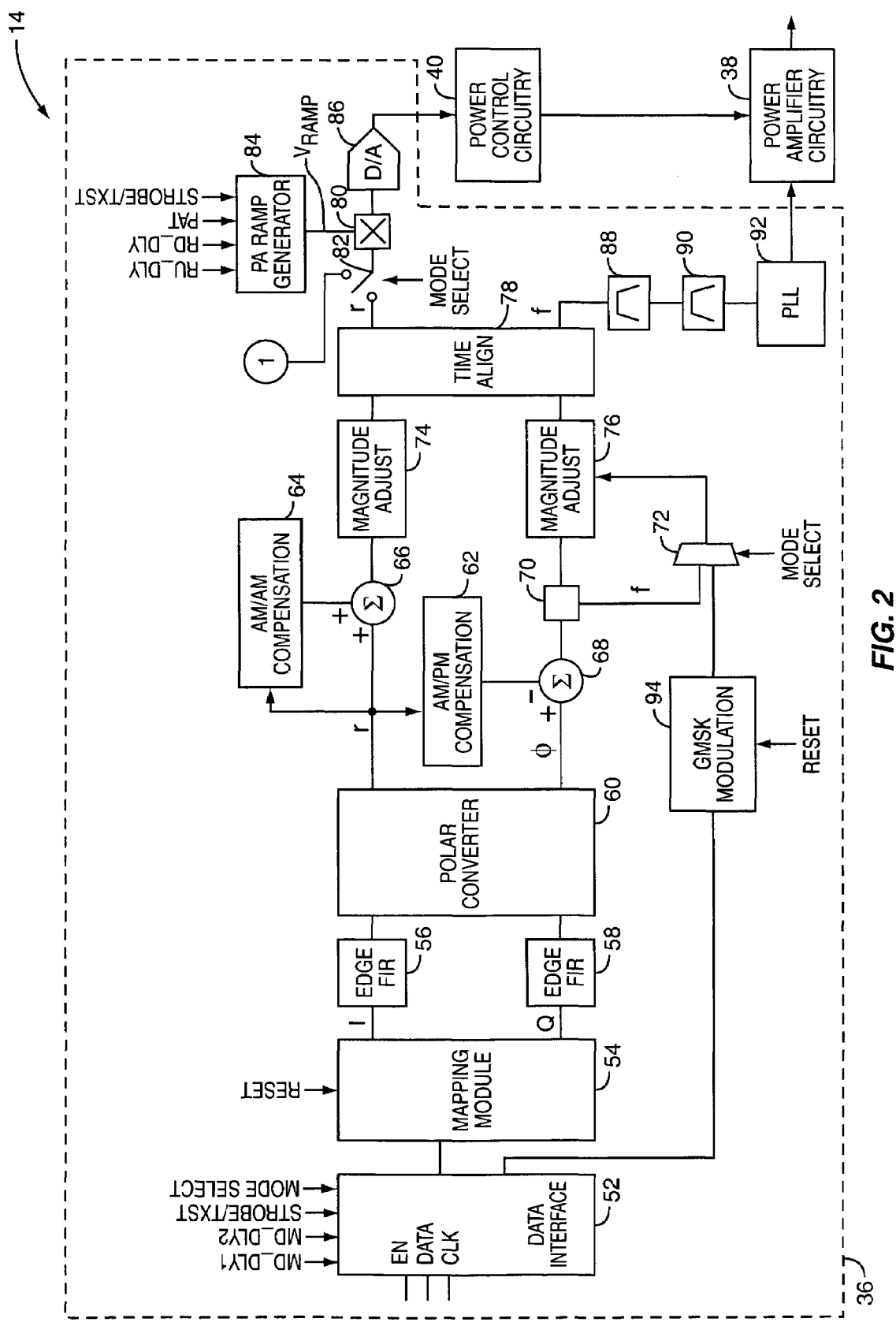
FIG. 2 illustrates an exemplary dual mode modulator according to one embodiment of the present invention.

FIG. 2 illustrates an exemplary embodiment of the modulator 36. In this embodiment, the modulator 36 operates in either 8PSK mode or GMSK mode based on the mode select signal (MODE SELECT). The modulator 36 includes several components, including a data interface 52, a mapping module 54, first and second filters 56, 58, and a polar converter 60. Other components of the modulator 36 will be discussed below. It should be noted that the data interface 52 may include First In First Out (FIFO) circuitry, as discussed below, or may alternatively be a real time serial data interface.

The mapping module 54, the filters 56, 58, and the polar converter 60 form an 8PSK modulator. As discussed below, in this embodiment, the 8PSK modulator also includes amplitude modulation to phase modulation (AM/PM) compensation circuitry 62, amplitude modulation to amplitude modulation (AM/AM) compensation circuitry 64, and various other components as described below.

When in 8PSK mode, the data interface 52 receives data from the baseband processor 20 (FIG. 1) at the bit rate of the system. This data is passed to the mapping module 54, where the data is grouped into symbols of three consecutive data bits, Grey coded, and rotated by $3\pi/8$ on each symbol as per European Telecommunications Standards Institute (ETSI) specifications. The resulting symbol is mapped to one of sixteen points in an in-phase (I), quadrature phase (Q) constellation.

Both the in-phase (I) and the quadrature phase (Q) components for each point are then filtered by the first and second filters 56, 58, respectively. In an exemplary embodiment, the first and second filters 56, 58 are EDGE finite impulse response (FIR) filters. This, as dictated by the ETSI specifications, shapes the response between symbol times.

After filtering, both the in-phase (I) and the quadrature phase (Q) components are sent to the polar converter 60. The polar converter 60 uses a classical CORDIC (coordinate rotation digital computer) algorithm or like rectangular to polar conversion technique. Thus, the polar converter 60 generates phase ($\phi$) and amplitude (r) equivalent signals. Further information about CORDIC algorithms may be found in *Proceedings of the 1998 ACM/SIGDA Sixth International Symposium On Field Programmable Gate Arrays* by Ray Andraka, Feb. 22-24, pp. 191-200 and "The CORDIC Trigonometric Computing Technique" by Jack E. Volder *IRE Trans on Elect. Computers*, p. 330, 1959, both of which are hereby incorporated by reference in their entirety.

The amplitude signal (r) is split and directed to the AM/PM compensation circuitry 62, the AM/AM compensation circuitry 64, and summation circuitry 66. The AM/PM compensation circuitry 62 introduces a compensation term to the phase signal via subtraction circuitry 68 that, after further processing, counteracts the distortion introduced by AM to PM conversion in the power amplifier circuitry 38. The AM/AM compensation circuitry 64 introduces a compensation term to the amplitude signal via the summation circuitry 66 that, after further processing, counteracts the distortion introduced by AM to AM conversion in the power amplifier circuitry 38. Further details of the AM/PM compensation circuitry 62 and the AM/AM compensation circuitry 64 can be found in commonly owned and assigned U.S. patent application Ser. No. 10/147,569 entitled AM TO PM CORRECTION SYSTEM FOR POLAR MODULATOR, filed May 16, 2002; and U.S. patent application Ser. No. 10/147,579 entitled AM TO AM CORRECTION SYSTEM FOR POLAR MODULATOR, filed May 16, 2002, both of which are hereby incorporated by reference in their entireties.

The output of the subtraction circuitry 68, which is referred to herein as a combined signal, is directed to a phase to frequency converter 70. The output of the phase to frequency converter 70 is a frequency signal (f). The frequency signal (f) is provided to a multiplexer switch 72, which is controlled by the mode select signal (MODE SELECT). When in the 8PSK mode, the mode select signal is provided such that the multiplexer switch 72 outputs the frequency signal (f) from the phase to frequency converter 70. Magnitude adjusters 74, 76 then adjust the magnitude of the amplitude signal (r) and the frequency signal (f), respectively, to a level expected by a time aligner 78, such that they comply with the appropriate standard. Next, a relative time delay is applied as necessary to the signals for best Error Vector Magnitude (EVM) and spectrum by the time aligner 78. Because these are preferably digital components, concerns about variations in analog components and the corresponding variation in time delays downstream are minimized.

At this point, the amplitude signal (r) and the frequency signal (f) separate and proceed by different paths, an amplitude signal processing path and a frequency signal processing path, to the power amplifier circuitry 38. With respect to the amplitude signal processing path, when in the 8PSK mode, the amplitude signal (r) is provided to a multiplier 80 via a switch 82, which is controlled by the mode select signal (MODE SELECT). A power amplifier (PA) ramp generator 84 generates a ramping signal ($V_{RAMP}$) and provides the ramping signal ($V_{RAMP}$) to the multiplier 80. The multiplier 80 operates to multiply the amplitude signal (r) and the ramping signal ($V_{RAMP}$) to provide a digital power control signal, which is converted to an analog power control signal by a digital-to-analog (D/A) converter 86. The analog power control signal is used by the power control circuitry 40 to set the collector voltage on the power amplifier circuitry 38. As the amplitude signal (r) changes, the voltage at the power amplifier circuitry 38 collector changes, and the output power will vary as $V^2/R_{out}$ ($R_{out}$ is not shown, but is effectively the load on the power amplifier circuitry 38). This is sometimes known as "plate modulation".

The frequency signal (f) from the time aligner 78 is directed to a digital filter 88, a digital predistortion filter 90, and a phase locked loop (PLL) 92, as is described in commonly invented, commonly owned U.S. patent application Ser. No. 10/139,560, filed May 6, 2002, entitled DIRECT DIGITAL POLAR MODULATOR, which is hereby incorporated by reference in its entirety. The PLL 92 generates an output at the desired radio frequency. In an exemplary embodiment, the frequency signal is applied to a single port on a fractional N divider within the PLL 92.

It should be noted that the data interface 52 provides default data (G_DEF, FIG. 6) to GMSK modulation circuitry 94 when in 8PSK mode. Similarly, when in GMSK mode, the data interface 52 provides default data (E_DEF, FIG. 5) to the mapping module 54. In addition, in one embodiment of the present invention, the data interface 52 provides default data (G_DEF, E_DEF) to both the mapping module 54 and the GMSK modulation circuitry 94 during a gap in data flow from the baseband processor 20 between transmit bursts, as described in detail below.

The modulator also includes a GMSK modulator, which includes the GMSK modulation circuitry 94. When in GMSK mode, default data (E_DEF) is provided to the mapping module 54 and the data to be transmitted is provided to GMSK modulation circuitry 94. The GMSK modulation circuitry 94 processes the data to generate a frequency signal. In one embodiment, the GMSK modulation circuitry 94 is a look-up table. Another exemplary embodiment of the GMSK modulation circuitry 94 is discussed in U.S. Pat. No. 5,825,257, which is hereby incorporated by reference in its entirety. It should be appreciated that other embodiments of the GMSK modulation circuitry 94 may also be used and the particular circuitry is not central to the present invention.

The output of the GMSK modulation circuitry 94 is provided to the multiplexer switch 72. In GMSK mode, the multiplexer switch 72 outputs the frequency signal from the GMSK modulation circuitry 94. As discussed above, magnitude adjusters 74, 76 then adjust the magnitude of the amplitude signal (r) and the frequency signal (f), respectively, to a level expected by a time aligner 78, such that they comply with the appropriate standard. Next, a relative time delay is applied as necessary to the signals for best Error Vector Magnitude (EVM) and spectrum by the time aligner 78.

At this point, the amplitude signal (r) and the frequency signal (f) separate and proceed by different paths to the power amplifier circuitry 38. With respect to the amplitude signal processing path, when in the GMSK mode, the switch 82 is controlled such that a unity signal is provided to the multiplier 80. Accordingly, the multiplier 80 multiplies the ramping signal ($V_{RAMP}$) from the PA ramp generator 84 by 1 to provide the digital power control signal, which is converted to the analog power control signal by the digital-to-analog converter 86. The analog power control signal is used by the power control circuitry 40 to set the collector voltage on the power amplifier circuitry 38.

Like in 8PSK mode, when in GMSK mode, the frequency signal (f) from the time aligner 78 is directed to the digital filter 88, the digital predistortion filter 90, and the PLL 92. The PLL 92 generates the output at the desired radio frequency. In an exemplary embodiment, the frequency signal is applied to a single port on a fractional N divider within the PLL 92.

Although the embodiment of the modulator 36 illustrated in FIG. 2 is a dual mode modulator, it should be noted that the modulator 36 may alternatively include separate modulators for each modulation mode, which will be apparent to one of ordinary skill in the art upon reading this disclosure.

Figure 3:
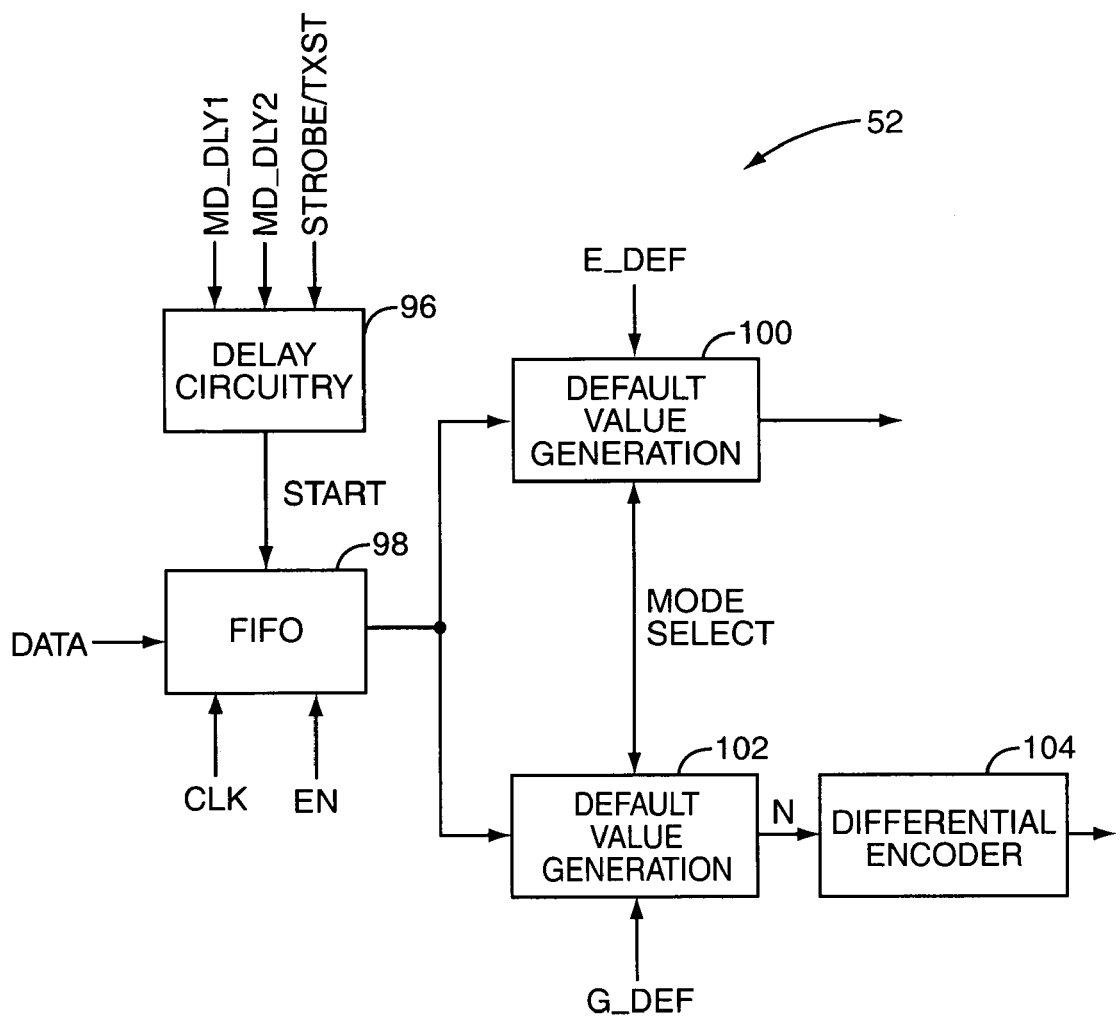
FIG. 3 is a more detailed illustration of an exemplary data interface of the dual mode modulator of FIG. 2 according to one embodiment of the present invention.

FIG. 3 illustrates an exemplary embodiment of the data interface 52. In general, the data interface 52 includes delay circuitry 96, First In First Out (FIFO) circuitry 98, default value generation circuitries 100, 102, and a differential encoder 104. In operation, the FIFO circuitry 98 receives the data from the baseband processor 20 (FIG. 1). As discussed below in more detail, the delay circuitry 96 receives a first modulator delay (MD_DLY1), a second modulator delay (MD_DLY2), and the strobe (STROBE) signal or transmit start signal (TXST). Upon receiving either the strobe signal or transmit start signal, the delay circuitry 96 provides a start signal (START) to the FIFO circuitry 98 that is delayed with respect to the strobe signal or transmit start signal by either a sum of the first modulator delay (MD_DLY1) and the second modulator delay (MD_DLY2) or by the second modulator delay (MD_DLY2) depending on whether it is a first transmit burst after startup or some subsequent transmit burst. Alternatively, the control system 22 (FIG. 1) may provide a single modulator delay to the delay circuitry 96 and control the value of the modulator delay as needed. Upon receiving the start signal (START), the FIFO circuitry 98 starts to output the data to the default value generation circuitries 100, 102. Thus, the delay circuitry 96 operates to delay the data from the FIFO circuitry 98 with respect to the strobe signal (STROBE) or transmit start signal (TXST).

When in 8PSK mode, the default value generation circuitry 100 provides the data from the FIFO circuitry 98 to the mapping module 54 (FIG. 2). When in GMSK mode, the default value generation circuitry 100 provides the default value (E_DEF) to the mapping module 54. Similarly, when in GMSK mode, the default value generation circuitry 102 provides the data from the FIFO circuitry 98 to the GMSK modulation circuitry 94 (FIG. 2) through the differential encoder 104. When in 8PSK mode, the default value generation circuitry 102 provides the default value (G_DEF) to the GMSK modulation circuitry 94 through the differential encoder 104. Also, during the gap in time between transmit bursts, the baseband processor may not provide data to the data interface 52, as described below. Accordingly, there is no data at the output of the FIFO circuitry 98. In this case, the default value generation circuitries 100, 102 provide the default data (E_DEF, G_DEF) to the mapping module 54 and the differential encoder 104, respectively. It should be noted that, in one embodiment, value for the default data (E_DEF, G_DEF) is either 0 or 1 and may be set by the control system 22 (FIG. 1).

Figure 4:
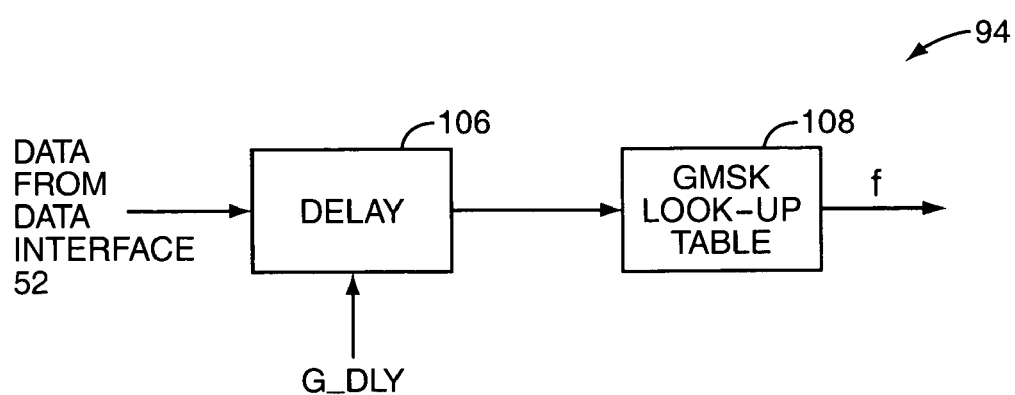
FIG. 4 is a more detailed illustration of exemplary Gaussian Minimum Shift Keying (GMSK) modulation circuitry of the dual mode modulator of FIG. 2 according to one embodiment of the present invention.

FIG. 4 illustrates an exemplary embodiment of the GMSK modulation circuitry 94. In general, the GMSK modulation circuitry 94 includes delay circuitry 106 and a GMSK look-up table 108. In general, the delay circuitry 106 delays the data received from the data interface 52 by an amount of time defined by a delay value (G_DLY) provided by the control system 22. As discussed below, in one embodiment, the delay circuitry 106 increases the latency of the modulator 36 (FIG. 1) when in GMSK mode such that the latency of the modulator 36 is the same for both GMSK mode and 8PSK mode. The GMSK look-up table 108 receives the delayed data from the delay circuitry 106 and outputs a frequency signal. In operation, the GMSK look-up table 108 operates as a GMSK modulator. Other embodiments of a GMSK modulator will be apparent to one of ordinary skill in the art upon reading this disclosure.

The exemplary embodiments of the data interface 52 and the GMSK modulation circuitry 94 shown in FIGS. 3 and 4 should not be considered as limiting. Numerous variations of the data interface 52 and GMSK modulation circuitry 94 of FIGS. 3 and 4 will be apparent to one of ordinary skill in the art upon reading this disclosure.

Triggering on Data Flow

One embodiment of the present invention provides a methodology for transitioning between the GMSK and 8PSK modes of operation between adjacent bursts, thereby transitioning between GPRS and EGPRS modes of operation for the mobile terminal 10. It should be noted that the present invention is not limited to the GMSK and 8PSK modulation formats. The present invention is equally applicable to any transmitter where it is desirable to transition between modulation formats in adjacent transmission bursts.

Figure 5:
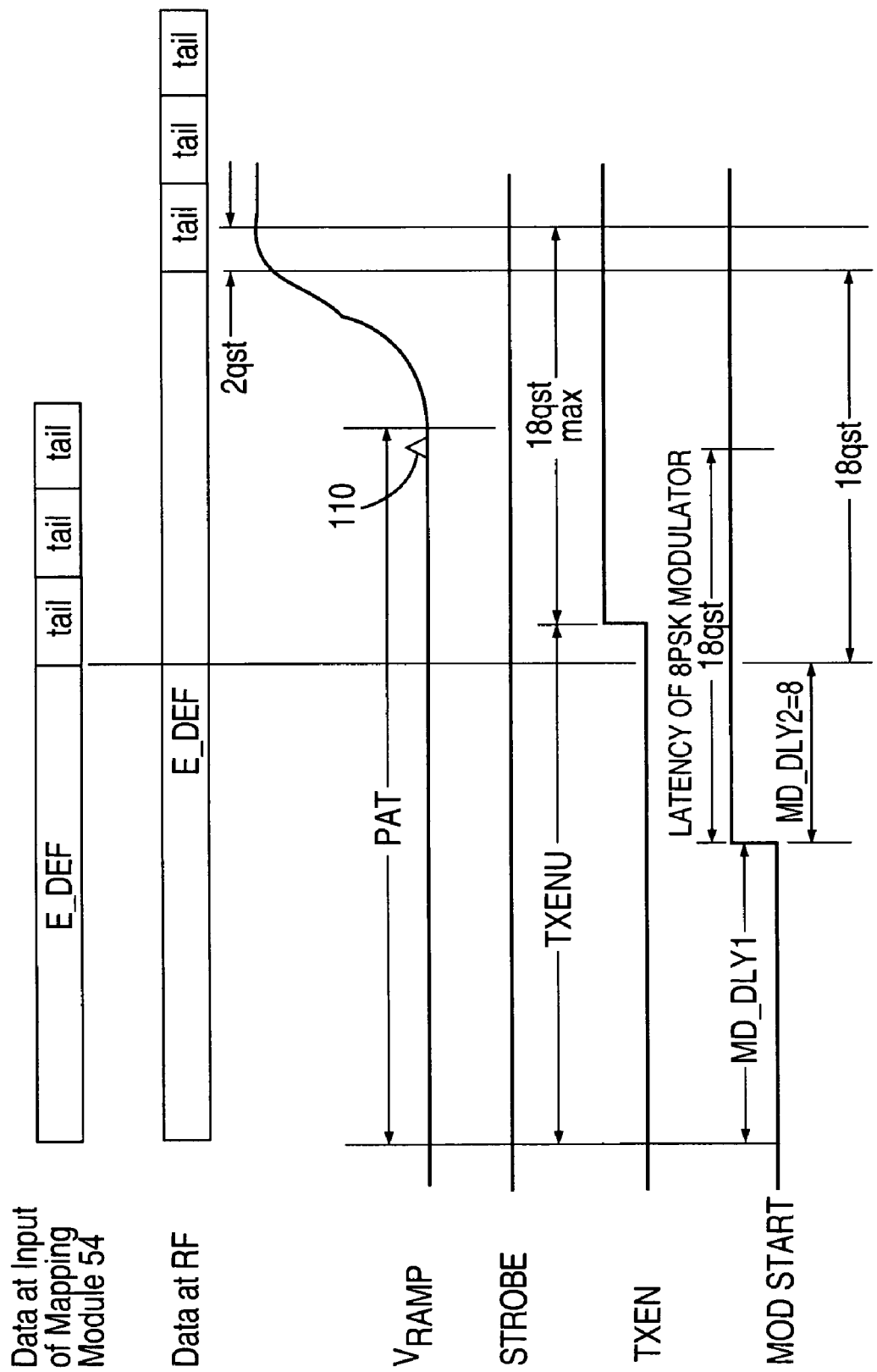
FIG. 5 is an exemplary timing diagram for a first transmit burst after start-up according to one embodiment of the present invention.

FIGS. 5-9 illustrate timing diagrams for an exemplary embodiment of the present invention where the transition is triggered by data flow. Before discussing the methodology for transitioning between modulation formats, it is beneficial to first discuss timing prior to a first transmission burst after start-up of the mobile terminal 10. A timing diagram for start-up in the 8PSK mode is illustrated in FIG. 5. At start up, the strobe signal (STROBE) is provided from the control system 22 to the modulator 36. Upon receiving a pulse on the strobe signal (STOBE), a first modulator delay (MD_DLY1) within the data interface 52 is started, and a PA timer (PAT) within the PA ramp generator 84 is started. At this point, default 8PSK data (E_DEF) is provided from the data interface 52 to the input of the mapping module 54. The purpose of MD_DLY1 and PAT are to delay the data from the data interface 52 and the ramping signal ($V_{RAMP}$) to provide sufficient time for the PLL 92 to lock and for any transmit calibrations to be completed before the first transmit burst occurs.

Upon the expiration of the first modulator delay (MD_DLY1), the modulator 36 is turned on by, for example, enabling clocks within both the mapping module 54 of the 8PSK modulator and the GMSK modulation circuitry 94. Also upon expiration of the first modulator delay (MD_DLY1), a second modulator delay timer (MD_DLY2) within the data interface 52 is started. The purpose of the second modulator timer (MD_DLY2) is to control the time at which a glitch 110 caused by turning on the modulator 36 occurs. More specifically, the second modulator delay (MD_DLY2) is selected such that the glitch 110 occurs before the output power of the power amplifier circuitry 38 begins to rise due to the ramping signal ($V_{RAMP}$). The glitch 110 is delayed from the point where the modulator 36 is turned on by a time equal to the latency of the modulator 36. As illustrated, the latency of the modulator 36 is 18 quarter symbol times (qst).

As an example to illustrate the function of the second modulator delay (MD_DLY2), assume that the second modulator delay (MD_DLY2) is set to 0. If MD_DLY2 is 0, then glitch 110 would be aligned with the beginning of the first tail symbol of the data. At this point, the output power of the power amplifier circuitry 38 has been ramped up, as indicated by the ramping signal ($V_{RAMP}$), and the glitch 110 would be seen in the output spectrum of the power amplifier circuitry 38, which is undesirable. Thus, the value of the second modulator delay (MD_DLY2) is selected such that the glitch 110 occurs before the output power of the power amplifier circuitry 38 is ramped-up.

In addition to controlling the time at which the glitch 110 occurs, the second modulator delay (MD_DLY2) may be selected to precisely control the time between bursts. According to ETSI standards, the timing from the center of the last tail symbol of the first transmit burst to the center of the first tail symbol for the second transmit burst is 37 qst. Each tail symbol is 4 qst. Thus, the time between the end of the last tail symbol of the first transmit burst to the start of the first tail symbol for the second transmit burst is 33 qst or 8¼ symbol times. Many prior art systems simply sent 8 guard symbols between transmit bursts, thereby causing a 1 qst timing error. However, according to the present invention, the second modulator delay (MD_DLY2) can be selected to control the time between bursts with quarter symbol resolution in addition to controlling the time at which the glitch 110 occurs. Thus, the 37 qst timing requirement of the ETSI standards can easily be met.

The second modulator timer (MD_DLY2) in combination with the default data (E_DEF) also provides the additional benefit of not requiring guard symbols to be sent to through the modulator 36 from the point where the modulator 36 is started to the time at which data is required to be sent to the modulator 36 such that the data is aligned with the ramping signal.

When the second modulator delay (MD_DLY2) expires, the FIFO circuitry 98 starts to provide data to the mapping module 54. As illustrated, the data includes 3 tail symbols. Due to the latency of the modulator 36, the data at radio frequency (RF), more specifically the amplitude signal (r) and the frequency signal (f) corresponding to the data, arrives at the power amplifier circuitry 38 at a time 18 qst after the first tail symbol is provided to the modulator 36.

At some point after the second modulator delay (MD_DLY2) has expired, the power amplifier circuitry 38 is enabled by the transmit enable signal (TXEN), and the PA timer (PAT) expires such that the PA ramp generator 84 starts to provide the ramping signal ($V_{RAMP}$). The PA timer (PAT) and the first and second modulator delays (MD_DLY1, MD_DLY2) are selected such that the ramping signal is aligned with the data symbols, as illustrated and required by ETSI standards.

It should be noted that only the first transmit burst after start-up uses the first modulator delay (MD_DLY1) and the PA timer (PAT). After the first transmit burst, the PLL 92 is locked and all transmit calibrations have been performed. Accordingly, delays for allowing the PLL 92 to lock and for transmit calibrations are not needed in subsequent transmit bursts. Further, these timers are not feasible between transmit bursts under ETSI standards.

Figure 6:
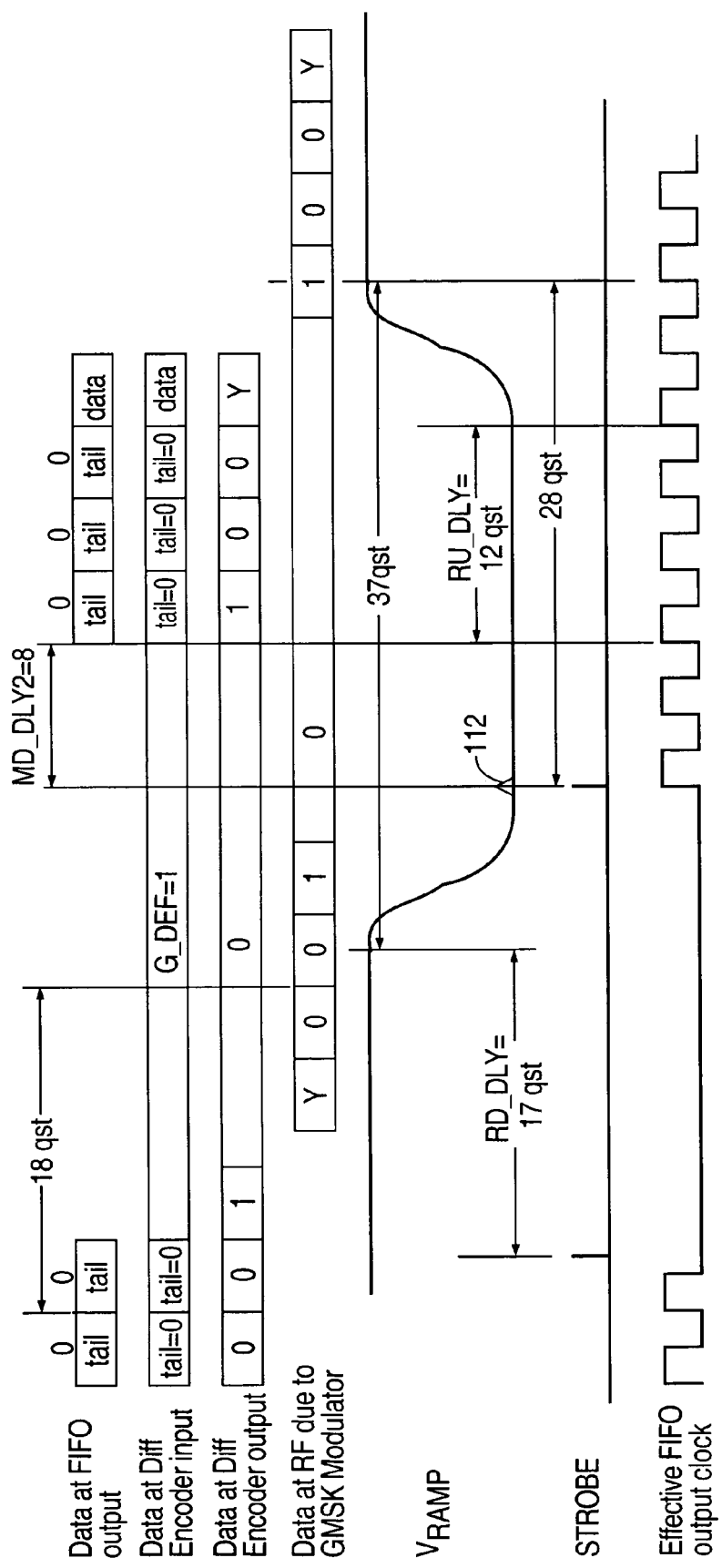
FIG. 6 is an exemplary timing diagram for a transition from a first Gaussian Minimum Shift Keying (GMSK) transmit burst to a second GMSK transmit burst according to one embodiment of the present invention.

Before describing the transition between the GMSK and 8PSK modes of operation, it is also beneficial to describe the timing for the transition between two adjacent GMSK transmit bursts. FIG. 6 is an exemplary timing diagram showing the transition between two adjacent GSMK transmit bursts. For this discussion, the exemplary embodiment of the data interface 52 illustrated in FIG. 3 and the exemplary embodiment of the GMSK modulation circuitry 94 illustrated in FIG. 4 will be used. The data is illustrated at various points in the modulator 36. First, the data at the output of the FIFO circuitry 98 is illustrated. It should be noted that, for this embodiment, the control system 22 is not required to send guard symbols to the data interface 52 during the gap between the data for a first transmit burst and the data for a second transmit burst. The first two tail symbols correspond to the end of the first transmit burst, the gap corresponds to the time between bursts, and the last three tails symbols and the data symbol correspond to the data for the second transmit burst.

The next line of data illustrates the data at the input to the differential encoder 104 within the data interface 52. During the time between bursts when there is no data at the output of the FIFO circuitry 98, the default value generation circuitry 102 provides the default data (G_DEF) to the input of the differential encoder 104.

The next line of data illustrates the data at the output of the differential encoder 104 within the data interface 52. In operation, the differential encoder 104 processes a current symbol and a previous symbol. If the current symbol and the previous symbol are the same, then the differential encoder 104 outputs a 0. If the current symbol and the previous symbol are different, then the differential encoder 104 outputs a 1. Thus, during the time between bursts when there is no data at the output of the FIFO circuitry 98, the default data (G_DEF) is provided to the differential encoder 104, and the differential encoder 104 outputs 0, except for the first symbol time during the time between bursts wherein it outputs 1.

The next line illustrates the data at radio frequency, which is the data at the input of the power amplifier circuitry 38. As illustrated, the data at RF is delayed with respect to the data at the output of the differential encoder 104 by a time which is equal to the latency of the modulator 36, which in this example is 18 qst. It should be noted that in the exemplary embodiments described herein, the modulator 36 has a latency of 18 qst when in 8PSK mode. Typically, the exemplary modulator 36 would have less latency when in GMSK mode. However, according to one embodiment of the present invention, the GMSK modulation circuitry 94 also includes the delay circuitry 106 such that the latency of the modulator 36 is the same for both GMSK mode and 8PSK mode.

The control system 22 provides the strobe signal (STROBE) to the modulator 36. The strobe signal (STROBE) is pulsed to trigger the beginning and end of a transmit burst. In the illustrated timing diagram, the first pulse of the strobe signal (STROBE) triggers the end of the data for the first transmit burst and the start of a ramp-down delay timer (RD_DLY) within the PA ramp generator 84. It should be noted that the pulse of the strobe signal (STROBE) is provided at a time that is not aligned with a rising edge or falling edge of an effective output clock of the FIFO circuitry 98. The effective output clock of the FIFO circuitry 98 shows the data rate out of the FIFO circuitry 98, which is equal to the modulation bit rate. The data is loaded into the FIFO circuitry 98 before the transmit burst begins at a predefined load bit rate. Then, when the transmit burst begins, the data is provided from the FIFO circuitry 98 at the modulation bit rate.

The ramp-down delay (RD_DLY) is selected such that the ramp-down delay (RD_DLY) expires at the center of the last symbol in the first transmit burst, as required by ETSI standards. In this embodiment, the ramp-down delay (RD_DLY) is 17 qst. The next pulse of the strobe signal (STROBE) triggers the beginning of the data for second transmit burst. More specifically, the next pulse of the strobe signal (STROBE) triggers the start of the second modulator delay timer (MD_DLY2) within the data interface 52, resetting of the GMSK modulation circuitry 94, and the beginning of data flow from the control system 22 to the data interface 52. In one embodiment, resetting the GMSK modulation circuitry 94 resets clocks associated with the GMSK modulation circuitry 94 such that the clocks are aligned with the bits of the data from the data interface 52. In another embodiment, resetting the GMSK modulation circuitry 94 causes the GMSK modulation circuitry 94 to start processing a new symbol even though the previous symbol, which corresponds to the default data, may not be complete, thereby aligning the data symbols from the data interface 52 and the output symbols of the GMSK modulation circuitry 94. Resetting the GMSK modulation circuitry 94 may include resetting clocks associated with the GMSK modulation circuitry 94.

Resetting the GMSK modulation circuitry 94 causes a glitch 112. The glitch 112 is due to the fact that resetting the GMSK modulation circuitry 94 abruptly terminated the symbol that the GMSK modulation circuitry 94 was processing to begin a new symbol. In this embodiment, the glitch 112 is not delayed by the delay circuitry 106 within the GMSK modulation circuitry 94. More specifically, the GSMK look-up table 108 has no latency. When clocks within the GSMK look-up table 108 are reset, the glitch 112 occurs instantaneously because the delay circuitry 106 is located before the GMSK look-up table 108. Thus, the glitch 112 is not delayed by the delay circuitry 106 and occurs at essentially the same time as the pulse of the strobe signal (STROBE) that triggers the beginning of the second transmit burst.

After the second modulator delay (MD_DLY2) has expired, the FIFO circuitry 98 begins to provide data to the differential encoder 104, and a ramp-up delay timer (RU_DLY) within the PA ramp generator 84 is started. When the ramp-up delay (RU_DLY) has expired, the PA ramp generator 84 begins to provide the ramp signal ($V_{RAMP}$). The ramp-up delay (RU_DLY) is selected such that the ramping signal ($V_{RAMP}$) and the data at RF are aligned according to ETSI specifications.

For the transition between two GMSK transmit bursts, it should be noted that, for this particular embodiment, the value of the second modulator delay (MD_DLY2) is not needed to control the position of the glitch 112 because the latency of the GMSK modulation circuitry 94 caused by the delay circuitry 106 does not affect the glitch 112. For example, if the second modulator delay (MD_DLY2) were set to 0, then the glitch 112 would still occur during the period when the ramping signal ($V_{RAMP}$) is at a minimum voltage. However, the second modulator delay (MD_DLY2) is used in this embodiment such that the value of the second modulator delay (MD_DLY2) does not have to be re-loaded during each transition. It should also be noted that other embodiments of the GMSK modulation circuitry 94 may have a latency that affects the glitch 112. In these embodiments, the second modulator delay (MD_DLY2) will be required such that the glitch 112 is not seen in the output spectrum of the power amplifier circuitry 38.

Figure 7:
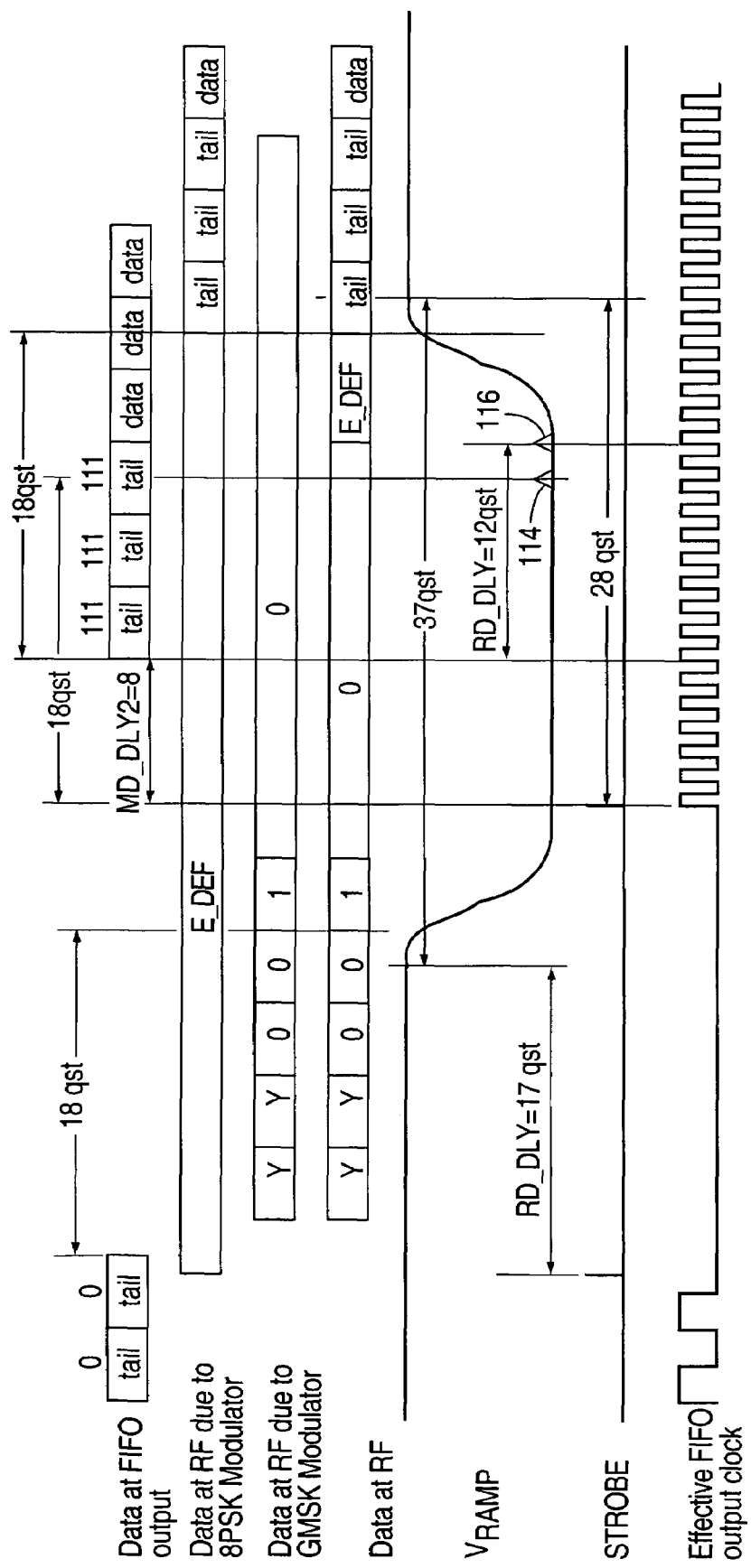
FIG. 7 is an exemplary timing diagram for a transition from a first GMSK transmit burst to a second 8-level Phase Shift Keying (8PSK) transmit burst according to one embodiment of the present invention.

FIG. 7 illustrates a timing diagram for a transition between a first GMSK transmit burst and a second 8PSK transmit burst. The data is illustrated at various points in the modulator 36. First, the data at the output of the FIFO circuitry 98 is illustrated. Again, it should be noted that, in this embodiment, the control system 22 is not required to send guard symbols to the data interface 52 during the gap between data for the first GMSK transmit burst and the second 8PSK transmit burst. The first two tail symbols correspond to the end of the first GMSK transmit burst, the gap corresponds to the time between bursts, and the last three tails symbols and the data symbols correspond to the data for the second 8PSK transmit burst.

The next line of data illustrates data at RF due to 8PSK modulation of the data within the modulator 36. As shown, during the first GMSK transmit burst and during the time between the two transmit bursts, the data at RF due to 8PSK modulation of the data is the default data (E_DEF). During the second 8PSK transmit burst, the data at RF due to 8PSK modulation corresponds to the data from the FIFO circuitry 98.

The next line of data illustrates data at RF due to GMSK modulation of the data within the modulator 36. As shown, during the first GMSK transmit burst, the data at RF due to GMSK modulation is differentially encoded, as described above, and corresponds to a differentially encoded version of the data at the output of the FIFO circuitry 98. During the time between the two transmit bursts and the second 8PSK transmit burst, the data at RF due to GMSK modulation of the data is a differentially encoded version of the default data (G_DEF) (FIG. 6).

The next line illustrates the data at RF, which is the data at the input of the power amplifier circuitry 38. As illustrated, the data at RF is delayed with respect to the data at the output of the FIFO circuitry 98 by a time which is equal to the latency of the modulator 36, which in this example is 18 qst. As stated above, in the exemplary embodiments described herein the modulator 36 has a latency of 18 qst when in 8PSK mode. Typically, the modulator 36 would have less latency when in GMSK mode. However, according to one embodiment of the present invention, the GMSK modulation circuitry 94 also includes the delay circuitry 106 such that the latency of the modulator 36 is the same for both GMSK mode and 8PSK mode.

The control system 22 provides the strobe signal (STROBE) to the modulator 36. In the illustrated timing diagram, the first pulse of the strobe signal (STROBE) triggers the end of the data for the first GMSK transmit burst and the start of the ramp-down delay timer (RD_DLY) within the PA ramp generator 84. It should be noted that the pulse of the strobe signal (STROBE) is provided at a time that is not aligned with a rising edge or falling edge of an effective output clock of the FIFO circuitry 98. The ramp-down delay (RD_DLY) is selected such that the ramp-down delay (RD_DLY) expires at the center of last symbol in the first GMSK transmit burst, as required by ETSI standards. In this embodiment, the ramp-down delay (RD_DLY) is 17 qst. The next pulse of the strobe signal (STROBE) triggers the beginning of the data for the second 8PSK transmit burst. More specifically, the next pulse of the strobe signal (STROBE) triggers the start of the second modulator delay timer (MD_DLY2) within the data interface 52, resetting of the 8PSK modulator, and the beginning of data flow from the control system 22 to the data interface 52 for the second 8PSK transmit burst. The 8PSK modulator is reset by, for example, resetting the mapping module 54. Resetting the mapping module 54 causes the mapping module 54 to start processing a new symbol even though the previous symbol, which corresponds to the default data, may not be complete. Thus, the data symbols from the data interface 52 are aligned with the output symbols of the mapping module 54. In one embodiment, resetting the mapping module 54 includes resetting one or more associated clocks. In another embodiment, resetting the mapping module 54 resets clocks associated with the mapping module 54 but does not cause the mapping module to start processing a new symbol even though the previous symbol is not complete.

In this example, the latency of the modulator 36 when in 8PSK mode is 18 qst. Accordingly, a glitch 114 caused by resetting the mapping module 54 occurs 18 qst after the second pulse of the strobe signal (STROBE). The second modulator delay (MD_DLY2) controls the time at which the glitch 114 occurs such that the glitch 114 occurs before the output power of the power amplifier circuitry 38 begins to rise due to the ramping signal ($V_{RAMP}$). For example, if the second modulator delay (MD_DLY2) were set to 0, the pulse of the strobe signal (STROBE) could be delayed 8 qst to keep the timing correct. However, in doing so, the glitch 114 would also be delayed 8 qst. Thus, the glitch 114 would occur at the beginning of the first tail symbol in the second 8PSK transmit burst at a point where the ramping signal ($V_{RAMP}$), and thus the output power of the power amplifier circuitry 38, is near a maximum for the second 8PSK transmit burst. This would greatly affect the performance of the mobile terminal 10. Accordingly, by using the second modulator delay (MD_DLY2), the point of time at which the glitch 114 occurs is controlled such that the glitch 114 occurs at a point in time when the ramping signal ($V_{RAMP}$), and thus the output power of the power amplifier circuitry 38, is at a minimum value. The second modulator timer (MD_DLY2) in combination with the default data (E_DEF) also provides the additional benefit of not requiring guard symbols to be sent to the data interface 52 from the control system 22 between the data for each transmit burst. It should also be noted that the second modulator delay (MD_DLY2) may also be selected such that the time between the center of the last tail symbol of the first transmit burst and the center of the first tail symbol of the second transmit burst is exactly 37 qst, as required by ETSI standards.

After the second modulator delay (MD_DLY2) has expired, the FIFO circuitry 98 begins to provide data to the mapping module 54, and a ramp-up delay timer (RU_DLY) within the PA ramp generator 84 is started. It should be noted that the data from the FIFO circuitry 98 is not differentially decoded when in 8PSK mode. When the ramp-up delay (RU_DLY) has expired, the PA ramp generator 84 begins to provide the ramp signal ($V_{RAMP}$) and the modulator 36 is switched from GMSK mode to 8PSK mode. The ramp-up delay (RU_DLY) is selected such that the ramping signal ($V_{RAMP}$) and the data at RF are aligned according to ETSI specifications. Since the mode of the modulator 36 is switched at the time ramp-up begins, a glitch 116 caused by switching the mode of the modulator 36 occurs before the output power of the power amplifier circuitry 38 begins to increase due to the ramping signal ($V_{RAMP}$).

Figure 8:
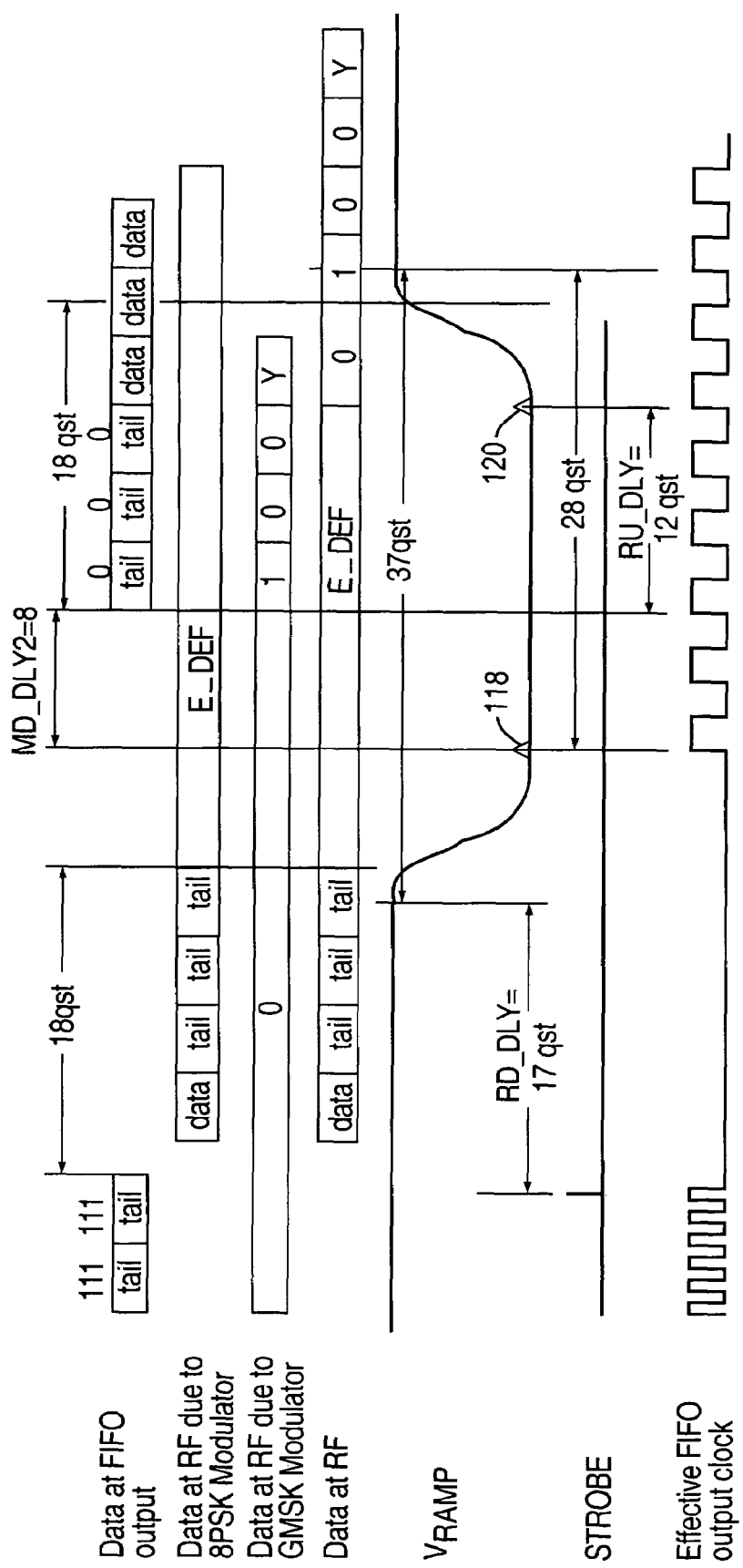
FIG. 8 is an exemplary timing diagram for a transition from a first 8PSK transmit burst to a second GMSK transmit burst according to one embodiment of the present invention.

FIG. 8 illustrates the transition between a first 8PSK transmit burst and a second GMSK transmit burst and is similar to FIG. 7. Again, the data is illustrated at various points in the modulator 36. First, the data at the output of the FIFO circuitry 98 is illustrated. The first two tail symbols correspond to the end of the first 8PSK transmit burst, the gap corresponds to the time between bursts, and the last three tails symbols and the data symbols correspond to the data for the second GMSK transmit burst.

The next line of data illustrates data at RF due to 8PSK modulation of the data within the modulator 36. As shown, during the first 8PSK transmit burst, the data at RF corresponds to the data at the output of the FIFO circuitry 98. During the time between the two transmit bursts and during the second GMSK transmit burst, the data at RF due to 8PSK modulation of the data is the default data (E_DEF).

The next line of data illustrates data at RF due to GMSK modulation of the data within the modulator 36. As shown, during the first 8PSK transmit burst and during the time between the transmit bursts, the data at RF due to GMSK modulation is 0, which is a differentially encoded version of the default data (G_DEF) (FIG. 4). During the second GMSK transmit burst, the data at RF due to GMSK modulation is a differentially encoded version of the data at the output of the FIFO circuitry 98.

The next line illustrates the data at RF, which is the data at the input of the power amplifier circuitry 38. As illustrated, the data at RF is delayed with respect to the data at the output of the FIFO circuitry 98 by a time which is equal to the latency of the modulator 36, which in this example is 18 qst. As stated above, in the exemplary embodiments described herein the modulator 36 has a latency of 18 qst when in 8PSK mode. Typically, the modulator 36 would have less latency when in GMSK mode. However, according to one embodiment of the present invention, the GMSK modulation circuitry 94 also includes delay circuitry 106 such that the latency of the modulator 36 is the same for both GMSK mode and 8PSK mode.

The control system 22 provides the strobe signal (STROBE) to the modulator 36. In the illustrated timing diagram, the first pulse of the strobe signal (STROBE) triggers the end of the data for the first 8PSK transmit burst and the start of the ramp-down delay timer (RD_DLY) within the PA ramp generator 84. It should be noted that the pulse of the strobe signal (STROBE) is provided at a time that is not aligned with a rising edge or falling edge of an effective output clock of the FIFO circuitry 98. The ramp-down delay (RD_DLY) is selected such that the ramp-down delay (RD_DLY) expires at the center of last symbol in the first 8PSK transmit burst, as required by ETSI standards. In this embodiment, the ramp-down delay (RD_DLY) is 17 qst.

The next pulse of the strobe signal (STROBE) triggers the beginning of the data for the second transmit burst. More specifically, the next pulse of the strobe signal (STROBE) triggers the start of the second modulator delay timer (MD_DLY2) within the data interface 52, resetting of the GMSK modulation circuitry 94, and the beginning of data flow from the control system 22 to the data interface 52 for the second transmit burst. As discussed above, resetting the GMSK modulation circuitry 94 causes a glitch 118 that, for this particular embodiment, is not delayed by the delay circuitry 106 within the GMSK modulation circuitry 94. Thus, the glitch 118 occurs at essentially the same time as the pulse of the strobe signal (STROBE) that triggers the beginning of the second transmit burst.

After the second modulator delay (MD_DLY2) has expired, the FIFO circuitry 98 begins to provide data to the differential encoder 104, and the ramp-up delay timer (RU_DLY) within the PA ramp generator 84 is started. When the ramp-up delay (RU_DLY) has expired, the PA ramp generator 84 begins to provide the ramp signal ($V_{RAMP}$), and the modulator 36 is switched from 8PSK mode to GMSK mode. The ramp-up delay (RU_DLY) is selected such that the ramping signal ($V_{RAMP}$) and the data at RF are aligned according to ETSI specifications. Since the mode of the modulator 36 is switched at the same time ramp-up begins, a glitch 120 caused by switching the modulator 36 from 8PSK mode to GMSK mode occurs before the output power of the power amplifier circuitry 38 begins to increase due to the ramping signal ($V_{RAMP}$).

Like the transition between two GMSK transmit bursts (FIG. 6), the value of the second modulator delay (MD_DLY2) is not needed to control the position of the glitch 118 during the transition from 8PSK mode to GMSK mode for this particular embodiment. For example, if the second modulator delay (MD_DLY2) were set to 0, then the glitch 118 would still occur during the period when the ramping signal ($V_{RAMP}$) is at a minimum voltage. However, the second modulator delay (MD_DLY2) is used in this embodiment such that the value of the second modulator delay (MD_DLY2) does not have to be re-loaded during each transition. Further, the second modulator delay (MD_DLY2) allows precise control of the time between the center of the last tail symbol of the first transmit burst and the center of the first tail symbol of the second transmit burst such that the 37 qst requirement of the ETSI standard can be met. The second modulator delay (MD_DLY2) in combination with the default values (E_DEF, G_DEF) also give the benefit of not requiring the control system 22 to send guard bits.

It should be noted that other embodiments of the GMSK modulation circuitry 94 may have a latency that affects the glitch 118. In these embodiments, the second modulator delay (MD_DLY2) will be required such that the glitch 118 is not seen in the output spectrum of the power amplifier circuitry 38.

Figure 9:
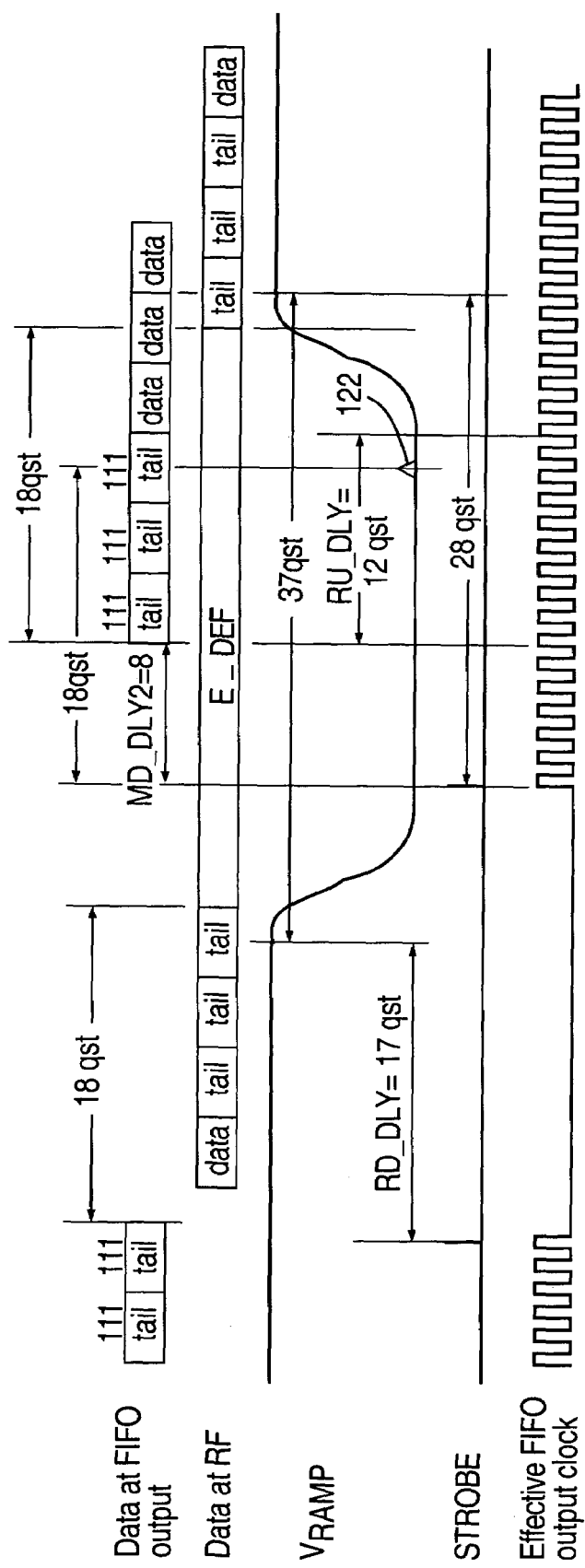
FIG. 9 is an exemplary timing diagram for a transition from a first 8PSK transmit burst to a second 8PSK transmit burst according to one embodiment of the present invention.

FIG. 9 illustrates a timing diagram for a transition between a first 8PSK transmit burst and a second 8PSK transmit burst. As illustrated, the data at RF corresponds to the data output from the FIFO circuitry 98 and is delayed with respect to the data output by the FIFO circuitry 98 by the latency of the modulator 36, which in this example is 18 qst. During the time between the transmit bursts, the data at RF is the default data (E_DEF).

The control system 22 provides the strobe signal (STROBE) to the modulator 36. In the illustrated timing diagram, the first pulse of the strobe signal (STROBE) triggers the end of the data for the first 8PSK transmit burst and the start of the ramp-down delay timer (RD_DLY) within the PA ramp generator 84. It should be noted that the pulse of the strobe signal (STROBE) is provided at a time that is not aligned with a rising or falling edge of an effective output clock of the FIFO circuitry 98. The ramp-down delay (RD_DLY) is selected such that the ramp-down delay (RD_DLY) expires at the center of last symbol in the first 8PSK transmit burst, as required by ETSI standards. In this embodiment, the ramp-down delay (RD_DLY) is 17 qst.

The next pulse of the strobe signal (STROBE) triggers the beginning of the data for the second 8PSK transmit burst. More specifically, the next pulse of the strobe signal (STROBE) triggers the start of the second modulator delay timer (MD_DLY2) within the data interface 52, resetting of the 8PSK modulator, and the beginning of data flow from the control system 22 to the data interface 52 for the second 8PSK transmit burst. As discussed above, the 8PSK modulator is reset by, for example, resetting the mapping module 54. In one embodiment, resetting the mapping module 54 causes the mapping module 54 to start processing a new symbol even though the previous symbol, which corresponds to the default data, may not be complete. Thus, the data symbols from the data interface 52 are aligned with the output symbols of the mapping module 54. In one embodiment, resetting the mapping module 54 includes resetting one or more associated clocks.

In this example, the latency of the modulator 36 when in 8PSK mode is 18 qst. Accordingly, a glitch 122 caused by resetting the mapping module 54 occurs 18 qst after the second pulse of the strobe signal (STROBE). According to the present invention, the second modulator delay (MD_DLY2) controls the time at which the glitch 122 occurs such that the glitch 122 occurs before the output power of the power amplifier circuitry 38 begins to rise due to the ramping signal ($V_{RAMP}$). For example, if the second modulator delay (MD_DLY2) were set to 0, the pulse of the strobe signal (STROBE) would be delayed 8 qst to keep the timing correct. However, in doing so, the glitch 122 would also be delayed 8 qst. Thus, the glitch 122 would occur at the beginning of the first tail symbol in the second 8PSK transmit burst at a point where the ramping signal ($V_{RAMP}$), and thus output of the power amplifier circuitry 38, is near a maximum for the second 8PSK transmit burst. This would greatly affect the performance of the mobile terminal 10.

By using the second modulator delay (MD_DLY2), the point of time at which the glitch 122 occurs is controlled such that the glitch 122 occurs at a point in time when the ramping signal ($V_{RAMP}$), and thus the output power of the power amplifier circuitry 38, is at a minimum value. The second modulator timer (MD_DLY2) in combination with the default data (E_DEF) also provides the additional benefit of not requiring guard symbols to be sent through the FIFO circuitry 98 to through the modulator 36 between the data for the first 8PSK transmit burst and the data for the second 8PSK transmit burst. It should also be noted that the second modulator delay (MD_DLY2) enables precise control of the time between transmit bursts, as discussed above.

After the second modulator delay (MD_DLY2) has expired, the FIFO circuitry 98 begins to provide data to the mapping module 54, and a ramp-up delay timer (RU_DLY) within the PA ramp generator 84 is started. When the ramp-up delay (RU_DLY) has expired, the PA ramp generator 84 begins to provide the ramp signal ($V_{RAMP}$). The ramp-up delay (RU_DLY) is selected such that the ramping signal ($V_{RAMP}$) and the data at RF are aligned according to ETSI specifications.

Triggering on Ramps

Figure 10:
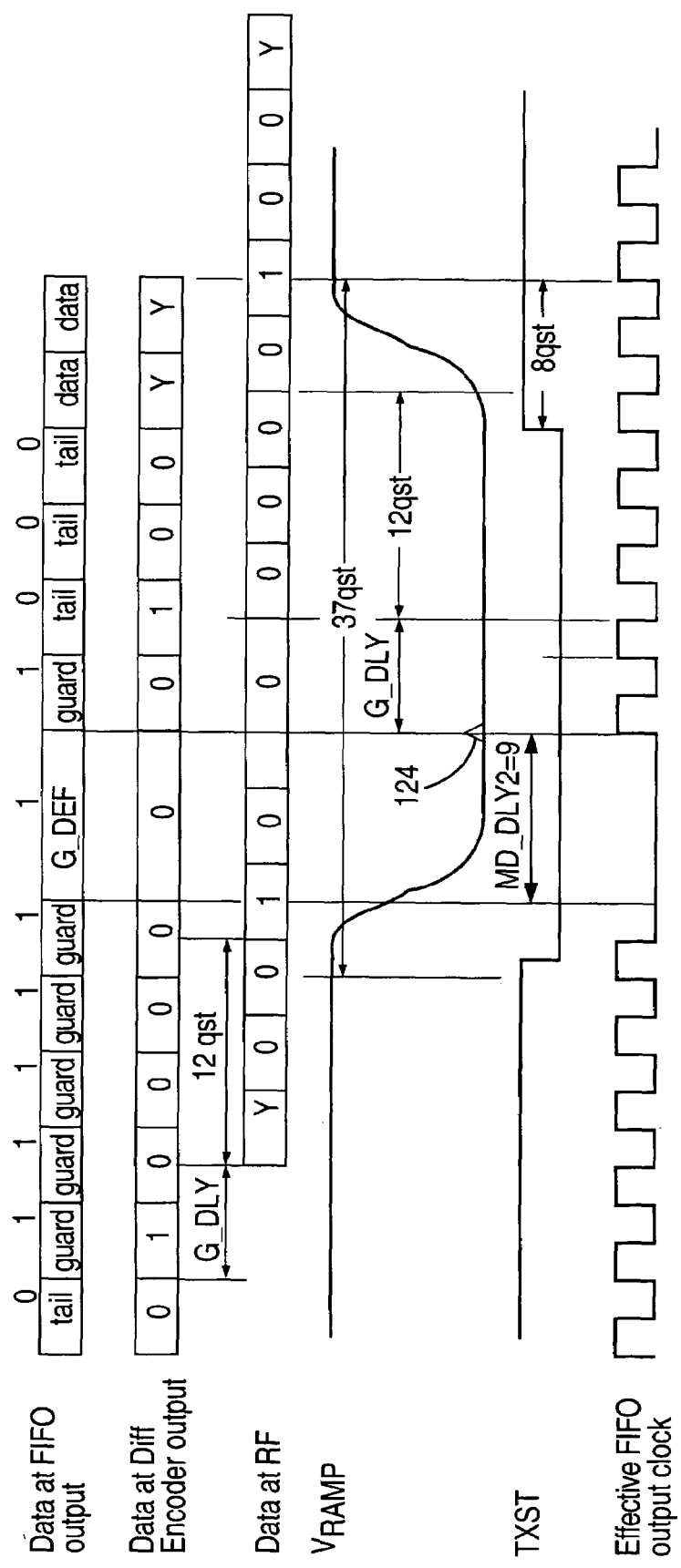
FIG. 10 is an exemplary timing diagram for a transition from a first GMSK transmit burst to a second GMSK transmit burst triggered on ramp-down according to one embodiment of the present invention.
Figure 11:
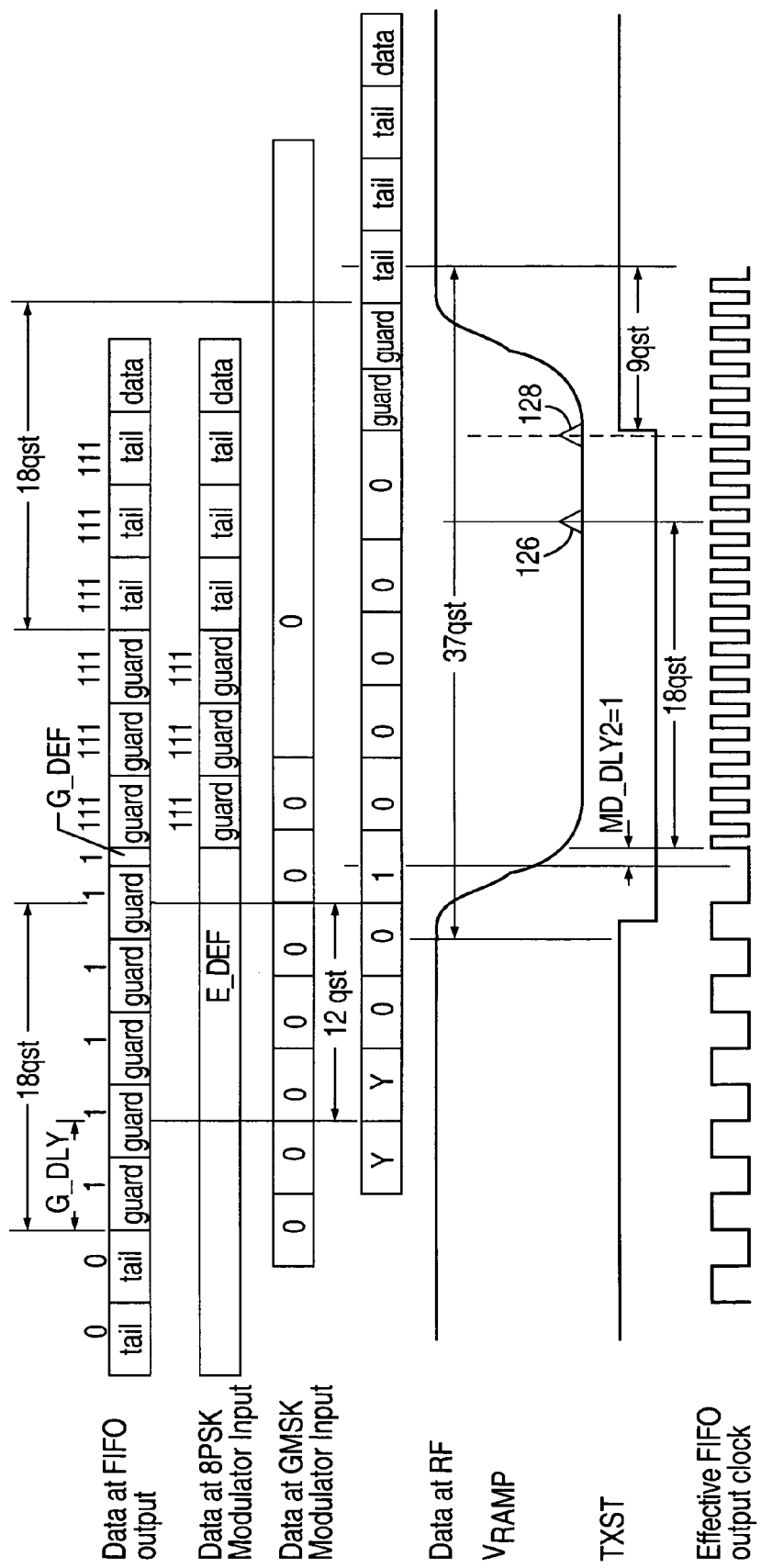
FIG. 11 is an exemplary timing diagram for a transition from a first GMSK transmit burst to a second 8PSK transmit burst triggered on ramp-down according to one embodiment of the present invention.

FIGS. 10 and 11 illustrate an exemplary embodiment of the present invention where the transition is triggered by ramp-down.

FIG. 10 illustrates a timing diagram for the transition between a first GMSK transmit burst and a second GMSK transmit burst according to a second embodiment of the present invention. The embodiment illustrated in FIGS. 6-9 triggered the second modulator delay (MD_DLY2) using a pulse on the strobe signal (STROBE) that initiates data flow into the FIFO circuitry 98. In this embodiment, the second modulator delay (MD_DLY2) is triggered by ramp-down rather than by data flow.

More specifically, the data is illustrated at various points in the modulator 36. First, the data at the output of the FIFO circuitry 98 is illustrated. In this embodiment, the control system 22 provides guard symbols to the FIFO circuitry 98. The first tail symbol corresponds to the end of the data for the first GMSK transmit burst, the guard symbols and the default data (G_DEF) correspond to the time between the two transmit bursts, and the last three tails symbols and the data symbols correspond to the data for the second GMSK transmit burst.

The next line of data illustrates the data at the output of the differential encoder 104 within the data interface 52, and the following line illustrates the data at RF, which is the data at the input of the power amplifier circuitry 38. As illustrated, the data at RF is delayed with respect to the data at the output of the differential encoder 104 by a time which is equal to the latency of the modulator 36, which in this example is 18 qst. It should be noted that in the exemplary embodiments described herein, the modulator 36 has a latency of 18 qst when in 8PSK mode. Typically, the exemplary modulator 36 would have less latency when in GMSK mode. However, according to the present invention, the GMSK modulation circuitry 94 also includes delay circuitry 106 such that the latency of the modulator 36 is the same for both GMSK mode and 8PSK mode. More specifically, in this embodiment, the GMSK modulation circuitry 94 has a latency of 12 qst, and the delay circuitry 106 adds an additional delay (G_DLY) of 6 qst such that the delay of the modulator 36 is the same for both GMSK and 8PSK mode.

The control system 22 provides the transmit start signal (TXST) to the modulator 36. Alternatively, the control system 22 may provide the strobe signal (STROBE). The transmit start signal (TXST) is switched high to trigger the ramp-up and switched low to trigger ramp-down. In the illustrated timing diagram, the transmit start signal (TXST) is switched low to trigger ramp-down at the end of the first GMSK transmit burst.

After the transmit start signal (TXST) transitions to low and the current symbol at the output of the FIFO circuitry 98 is complete, the second modulator delay timer (MD_DLY2) within the data interface 52 is started. During the second modulator delay (MD_DLY2), the data interface 52 outputs the default data (G_DEF). Once the second modulator delay (MD_DLY2) expires, the GMSK modulation circuitry 94 is reset and next guard symbol is output by the FIFO circuitry 98. Resetting the clocks associated with the GMSK modulation circuitry 94 causes a glitch 124 that, for this particular embodiment, is not delayed by the delays within the GMSK modulation circuitry 94, as discussed above. Thus, the glitch 124 occurs at the time the second modulator delay (MD_DLY2) has expired and the clocks are reset.

After the second modulator delay (MD_DLY2) has expired, the FIFO circuitry 98 begins to provide data to the differential encoder 104. As illustrated, after the second modulator delay (MD_DLY2) has expired, the FIFO circuitry 98 provides a guard symbol and then the tail symbols and data symbols of the data corresponding to the second GMSK transmit burst. The control system 22 switches the transmit start signal (TXST) back to high to begin ramp-up. The transmit start signal (TXST) is switched high, and thus ramp-up begins, at a time that will ensure that the ramping signal ($V_{RAMP}$) is aligned with the first tail symbol of the second GMSK transmit burst according to ETSI specifications.

For the transition between two GMSK transmit bursts, it should be noted that the value of the second modulator delay (MD_DLY2) is used to control the position of the glitch 124. For example, if the second modulator delay (MD_DLY2) were set to 0, then the glitch 124 would occur during the ramp-down, where the output power of the power amplifier circuitry 38 is not at a minimum. Accordingly, the glitch 124 would be seen the output spectrum of the power amplifier circuitry 38. It should also be noted that the second modulator delay (MD_DLY2) allows the 37 qst period between the center of the last tail symbol of the first transmit burst and the center of the first tail symbol of the second transmit burst to be achieved as specified by ETSI standards.

FIG. 11 illustrates an exemplary timing diagram for the transition, triggered by ramps, between a first GMSK transmit burst and a second 8PSK transmit burst. First, the data at the output of the FIFO circuitry 98 is illustrated. In this embodiment, the control system 22 provides guard symbols to the data interface circuitry 52. The first two tail symbols correspond to the end of the first GMSK transmit burst, the guard symbols and the default data (G_DEF) correspond to the time between the two transmit bursts, and the last three tails symbols and the data symbol correspond to the data for the second 8PSK transmit burst.

The next line of data illustrates the data at the input of the 8PSK modulator, which is the input of the mapping module 54. During the first GMSK transmit burst and until the second modulator delay (MD_DLY2) has expired, the data at the input of the 8PSK modulator is the default data (E_DEF). After the second modulator delay (MD_DLY2) has expired and during the second 8PSK transmit burst, the data at the input of the 8PSK modulator is the output of the FIFO circuitry 98.

The next line of data illustrates the data at the input of the GMSK modulator, which is the input of the GMSK look-up table 108 after the data has been delayed by G_DLY qst by the delay circuitry 106. As discussed above, the delay G_DLY is a delay that increases the delay of the modulator 36 when in GMSK mode such that the latency of the modulator 36 is the same for GMSK mode and 8PSK mode. During the first GMSK transmit burst and until the second modulator delay (MD_DLY2) is started, the data at the input of the GMSK modulator is a differentially encoded version of the data output by the FIFO circuitry 98. After the second modulator delay (MD_DLY2) is started and during the second 8PSK transmit burst, the data at the input of the GMSK modulator is a differentially encoded version of the default data (G_DEF).

The next line illustrates the data at radio frequency, which is the data at the input of the power amplifier circuitry 38. As illustrated, the data at RF is delayed with respect to the data at the output of the FIFO circuitry 98 by a time which is equal to the latency of the modulator 36, which in this example is 18 qst. Until the mode change occurs, the data at RF is an RF version of the data at the input of the GMSK modulator. After the mode change occurs, the data at RF is an RF version of the data at the input of the 8PSK modulator.

The control system 22 provides the transmit start signal (TXST) to the modulator 36. Alternatively, the control system 22 may provide the strobe signal (STROBE). The transmit start signal (TXST) is switched high to trigger ramp-up and switched low to trigger ramp-down. In the illustrated timing diagram, the transmit start signal (TXST) is switched low to trigger ramp-down at the end of the first GMSK transmit burst. After the transmit start signal (TXST) transitions to low and the current symbol at the output of the FIFO circuitry 98 is complete, the second modulator delay timer (MD_DLY2) within the data interface 52 is started.

During the second modulator delay (MD_DLY2), the data interface 52 outputs the default data (G_DEF).

Once the second modulator delay (MD_DLY2) expires, the 8PSK modulator is reset, as discussed above, and data flow from the control system 22 to the data interface 52 for the second transmit burst begins. Resetting the 8PSK modulator causes a glitch 126. Due to the latency of the modulator 36, the glitch 126 occurs 18 qst after the second modulator delay (MD_DLY2) has expired, where 18 qst is the latency of the modulator 36 when in 8PSK mode. As discussed above, the second modulator delay (MD_DLY2) is variable and can be selected such that the glitch 126 occurs during a minimum output power period in order to prevent degradation of the output spectrum of the power amplifier circuitry 38.

As illustrated, after the second modulator delay (MD_DLY2) has expired, the FIFO circuitry 98 provides three guard symbols and then the tail symbols and data symbols of the data corresponding to the second 8PSK transmit burst. Sometime before ramp-up begins, the control system 22 switches the mode of the modulator 36 from GMSK mode to 8PSK mode, which causes a glitch 128. Since the mode of the modulator 36 is switched during the minimum output power period, degradation of the output spectrum of the power amplifier circuitry 38 is avoided.

To begin ramp-up, the control system 22 switches the transmit start signal (TXST) back to high at a time that will ensure that the ramping signal ($V_{RAMP}$) is aligned with the first tail symbol of the second 8PSK transmit burst according to ETSI specifications.

The present invention provides substantial opportunity for variation without departing from the spirit and scope of the present invention. For example, the modulator 36 is described above as a dual mode modulator. However, the modulator 36 may be enabled to operate according to any number of formats, wherein the present invention would enable transitioning between any two of the formats during a period of time between adjacent transmit bursts in a multi-timeslot frame. As another example, rather than being a dual mode modulator, the modulator 36 may include separate modulators for each mode. However, it should be noted that the modulator 36 of FIG. 2 includes a 8PSK modulator and a GMSK modulator, wherein the input of the 8PSK modulator is the input to the mapping module 54 and the input to the GMSK modulator is the input to the GMSK modulation circuitry 94. As yet another example, the data interface 52 may be a serial data interface or a FIFO interface.

Those skilled in the art will recognize improvements and modifications to the preferred embodiments of the present invention. All such improvements and modifications are considered within the scope of the concepts disclosed herein and the claims that follow.

The invention claimed is:

1. A method enabling transition from a first modulation format for a first transmit burst to a second modulation format for a second transmit burst adjacent to the first transmit burst comprising:

providing data for a first transmit burst to first modulation circuitry operating according to a first modulation format;

upon receiving a timing control signal triggering ramp-down of an output power of a power amplifier amplifying modulated data from the first modulation circuitry for the first transmit burst, providing a current symbol of the data for the first transmit burst to the first modulation circuitry;

upon completion of providing the current symbol delaying data for a second transmit burst by a variable modulator delay time to provide delayed data;

providing the delayed data for the second transmit burst to second modulation circuitry operating according to a second modulation format at an expiration of the variable modulator delay time; and resetting the second modulation circuitry at the expiration of the variable modulator delay time;

wherein the variable modulator delay time is selected such that a glitch caused by resetting the second modulation circuitry occurs at an output of the second modulation circuitry before ramp-up of the output power of the power amplifier for amplifying modulated data from the output of the second modulation circuitry for the second transmit burst.

2. The method of claim 1 wherein the variable modulator delay time is selected such that the time at which the glitch occurs is before ramp-up of the output power of the power amplifier and while the output power of the power amplifier is at a minimum output power between the first and second transmit bursts.

3. The method of claim 1 wherein the glitch caused by resetting the second modulation circuitry occurs at a time equal to a latency of the second modulation circuitry after resetting the second modulation circuitry.

4. The method of claim 3 further comprising further delaying the data for the second transmit burst within the second modulation circuitry such that the latency of the second modulation circuitry is equal to a latency of the first modulation circuitry.

5. The method of claim 4 wherein further delaying the data for the second transmit burst increases the latency of the second modulation circuitry from a first latency to a second latency and the glitch occurs at a time equal to the first latency after resetting the second modulation circuitry.

6. The method of claim 1 further comprising generating a ramping signal for controlling ramp-up and ramp-down of the output power of the power amplifier for each of the first and second transmit bursts, wherein the ramping signal is ramped-up upon receiving a timing control signal triggering ramp-up and the ramping signal is ramped-down upon receiving the timing control signal triggering ramp-down.

7. The method of claim 1 wherein the first modulation format is a Gaussian Minimum Shift Keying (GMSK) modulation format and the second modulation format is an 8-level Phase Shift Keying (8PSK) modulation format.

8. The method of claim 1 wherein the first modulation format is an 8-level Phase Shift Keying (8PSK) modulation format and the second modulation format is a Gaussian Minimum Shift Keying (GMSK) modulation format.

9. A modulation system enabled to transition from a first modulation format for a first transmit burst to a second modulation format for a second transmit burst adjacent to the first transmit burst comprising:

a) first modulation circuitry operating to modulate data for a first transmit burst according to a first modulation format;

b) interface circuitry adapted to:

i) upon receiving a timing control signal signifying ramp-down of an output power of a power amplifier amplifying modulated data from the first modulation circuitry for the first transmit burst, provide a current symbol of the data for the first transmit burst to the first modulation circuitry;

ii) upon completion of providing the current symbol, delay data for a second transmit burst by a variable modulator delay time to provide delayed data; and iii) provide the delayed data for the second transmit burst to second modulation circuitry operating according to a second modulation format at an expiration of the variable modulator delay time; and c) the second modulation circuitry that is reset at the expiration of the variable modulator delay time and adapted to modulate the data for the second transmit burst according to the second modulation format;

wherein the variable modulator delay time is selected such that a glitch caused by resetting the second modulation circuitry occurs at an output of the second modulation circuitry before ramp-up of the output power of the power amplifier for amplifying modulated data from the output of the second modulation circuitry for the second transmit burst.

10. The modulation system of claim 9 wherein the variable modulator delay time is selected such that the time at which the glitch occurs is before ramp-up of the output power of the power amplifier and while the output power of the power amplifier is at a minimum output power between the first and second transmit bursts.

11. The modulation system of claim 9 wherein the glitch caused by resetting the second modulation circuitry occurs at a time equal to a latency of the second modulation circuitry after resetting the second modulation circuitry.

12. The modulation system of claim 11 wherein the second modulation circuitry comprises delay circuitry adapted to further delay the data for the second transmit burst such that the latency of the second modulation circuitry is equal to a latency of the first modulation circuitry.

13. The modulation system of claim 12 wherein the delay circuitry further delays the data for the second transmit burst such that the latency of the second modulation circuitry increases from a first latency to a second latency and the glitch occurs at a time equal to the first latency after resetting the second modulation circuitry.

14. The modulation system of claim 9 further comprising ramp generation circuitry adapted to generate a ramping signal for controlling ramp-up and ramp-down of the output power of the power amplifier for each of the first and second transmit bursts, wherein the ramping signal is ramped-up upon receiving a timing control signal triggering ramp-up and the ramping signal is ramped-down upon receiving the timing control signal triggering ramp-down.

15. The modulation system of claim 9 wherein the first modulation format is a Gaussian Minimum Shift Keying (GMSK) modulation format and the second modulation format is an 8-level Phase Shift Keying (8PSK) modulation format.

16. The modulation system of claim 9 wherein the first modulation format is an 8-level Phase Shift Keying (8PSI) modulation format and the second modulation format is a Gaussian Minimum Shift Keying (GMSK) modulation format.

\* \* \* \* \*